United States Patent Office 3,311,814
Patented Mar. 28, 1967

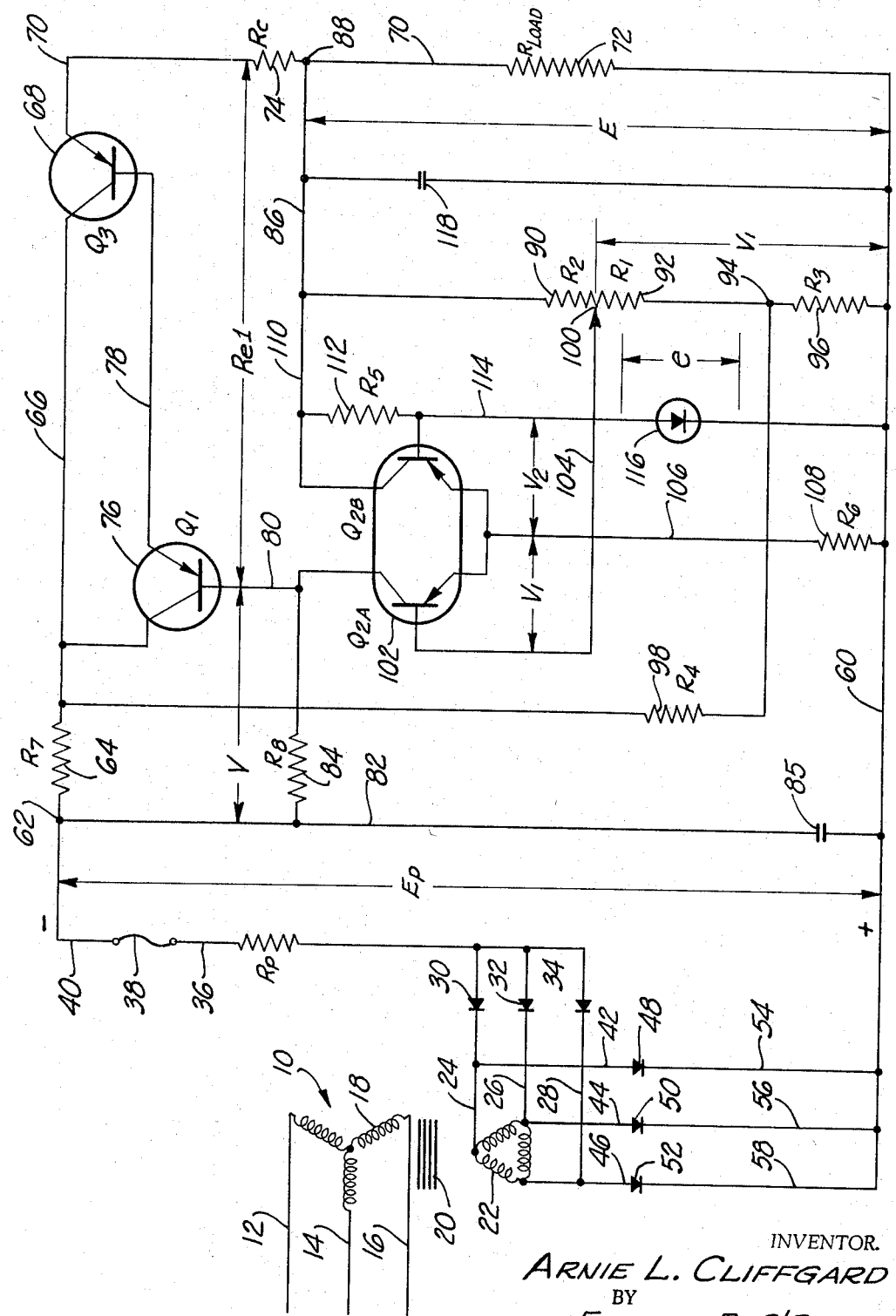

3,311,814
REGULATED POWER SUPPLY
Arnie L. Cliffgard, 12624 Lakewood Blvd.,
Downey, Calif. 90242
Filed June 6, 1963, Ser. No. 286,113
1 Claim. (Cl. 323—9)

This invention is directed to a voltage regulator for the regualtion of a direct current power supply voltage.

The supply of direct current power is well known, in that it is common to supply a direct current by rectifying it from an alternating current supply. Such power supplies normally incorporate a plurality of rectifiers connected in different phase relationships so that a minimum output ripple appears as a result of the rectification. Further improvement of such supplies has been made in reducing the ripple by having an appropriate reactive network paralleled thereacross for filter purposes. Such power supplies have very poor voltage regualtion characteristics, especially when extreme accuracy of voltage is desired. Regulation of such voltages has been accomplished by means of transistorized voltage regulators. However, these regulators have failed both in theory and in practice to create a fully stabilized output voltage.

Accordingly, it is an object of this invention to provide a transistorized voltage regulator which provides an output voltage which is substantially constant over large variations in line voltage during both current and temperature extremes.

It is another object of this invention to provide a D.C. voltage regulator which provides an accurate output voltage both in theory and in practice.

It is another object of this invention to provide an accurate voltage regulator which has a minimum number of components so as to cause the regulator to be economic and reliable.

Other objects and advantages of this invention will be apparent upon reference to the following specification, claim and attached drawing in which:

The single figure of the drawing is a schematic representation of the voltage regulator of this invention.

In short summary, it can be stated that this regualtor uses a transistor to reduce the unregulated D.C. supply voltage to the regulated voltage. This transistor in turn is controlled through an intermediate transistor by signals including a load current signal, a supply voltage signal and a constant voltage reference signal. Each of these signals is combined in such a way so as to control the voltage regulating transistor for compensation for variations in each of those signals. The preferred embodiment will be more readily understood upon reference to the following specification and drawing.

As shown in the drawing, D.C. power is supplied by a transformer rectifier combination generally indicated at 10. This supply comprises three phase alternating current furnished through lines 12, 14 and 16. These lines are connected to the primary of a Y connected transformer primary 18. The primary 18 is inductively coupled through iron 20 to the delta connected secondary 22. The corners of the delta are connected to lines 24, 26 and 28 which are respectively connected to diodes 30, 32 and 34. The diodes 30, 32, and 34 are connected to line 36 which is connected to fuse 38 which in turn is connected to the negative unregulated supply bus 40. Lines 24, 26 and 28 are respectively connected to lines 42, 44 and 46, which in turn are respectively connected to diodes 48, 50 and 52. Diodes 48, 50 and 52 in turn are connected respectively through lines 54, 56 and 58 to the positive supply bus 60. The supply bus 60 may be a conventional common return line, or may be a grounded chassis, as desired. It can be seen that the circuit thus far described is a conventional rectifier circuit which supplies an unregulated direct current with the maximum current controlled by fuse 38.

This unregulated direct current supply could be from any other convenient and conventional source. Generation of a direct current by means of rotary machinery, is also feasible for use with the hereinafter described voltage regulator. The only requirement of the unregulated direct current source is that its voltage is high enough to be slightly reduced to the desired regulated voltage. In other words if a 35 volt regulated voltage is desired at the load, the supply unregulated voltage should be at least in the order of 38 volts R.M.S. Of course, the value of the unregulated voltage depends on the amount of ripple present, if the ripple is large. Basically, the minimum voltage, rather than the R.M.S. voltage, should exceed the desired regulated voltage by at least 3 volts.

The negative unregulated bus 40 is connected to point 62 to which is also connected resistor R7 identified by numeral 64. Resistor R7 measures the load current and compensates for voltage changes due to load, in the manner hereinafter described. Resistor R7 is also connected to line 66 which in turn is connected to the collector of PNP power transistor Q3 also identified by numeral 68. Transistor Q3 has an emitter in turn connected through line 70 to the load which is represented by resistor 72. The other side of the load resistor 72 is connected to the bus 60. Resistor 74, shown within line 70, represents the resistance of this line.

Transistor Q1, identified by numeral 76, has its collector connected to line 66 and its emitter connected through line 78 to the base of transistor Q3. The base of transistor Q1 is connected to line 80, and it can be seen that control of line 80 thus controlling transistor Q1, in turn controls the conductivity of transistor Q3 to thus control the voltage across load 72. Point 62 is connected to line 82 which is in turn connected both through resistance 84 to line 80 and through capacitor 85 to line 60.

Line 110 is connected to line 70 adjacent to load 72 at point 88 and is serially connected through resistance R2, identified by numeral 90, resistance R1 identified by numeral 92, point 94, resistance R3, identified by numeral 96, to line 60. Line 66 is connected through resistance R4, identified by numeral 98, to point 94. The resistances 90 and 92 form a voltage divider with a center tap 100 which may be adjustable, if desired. Transistor 102 has two matched PNP transistors within the same body. These are identified as transistor Q2A and transistor Q2B. The base of transistor Q2A is connected through line 104 to the tap point 100. The collector of transistor Q2A is connected to line 80, while the emitter of this transistor is connected to the emitter of transistor Q2B, and both of them are connected through line 106, through resistor R6 identified by numeral 108, to line 60. This line in turn is connected to the collecter of transistor Q2B, and is connected through resistor R5, identified by numeral 112, to the base of transistor Q2B. This base in turn is connected through line 114 through Zener diode 116 which in turn is connected to line 60. Line 86 is also connected through capacitor 118 to line 60.

While in actual practice, due to its applicability to a large number of different voltage regulation problems, the values of the various elements of this circuit may vary widely depending on the circumstances and requirements of the particular application, specific values of the components are given below to illustrate as an example one specific embodiment of this circuit. These values are considered exemplary and not restrictive.

Element:                      Exemplary embodiment
  Resistor R1 _____ 777 ohms±.1%.
  Resistor R2 _____ 2517 ohms±.1%.

| Element: | Exemplary embodiment |
|---|---|
| Resistor R3 | 56 ohms ±.5%. |
| Resistor R4 | 5500 ohms ±.5%. |
| Resistor R5 | 5000 ohms ±1%. |
| Resistor R6 | 2370 ohms ±.05%. |
| Resistor R7 | 2.6 ohms ±5%. |
| Resistor R8 | 9125 ohms ±.05%. |
| Transistor Q1 | Fairchild 2 N 1132. |
| Transistor Q2 | Fairchild FSP–24. |
| Transistor Q3 | Bendix 2 N 637 B. |
| Zener diode 116 | Motorola 1 N 939 B. |
| Capacitor 86 | 30 mfd. at 75 volts. |
| Capacitor 118 | 30 mfd. at 75 volts. |

These values are particularly suited to a three phase 400 cycle alternating current rectifier producing a minimum voltage of 38 volts between point 62 and line 60. This results in the maximum stabilized voltage across load 72 of 35 volts. With a load of 120 ohms at resistance 72, a 10 millivolt peak to peak ripple is the maximum to be expected. With a change in temperature from −45° C. to +70° C., a 10 millivolt voltage change is the maximum to be expected. These results are excellent and are available in the voltage regulator of this invention because it meets the practical and theoretical requirements for accurate regulation.

The theory behind this voltage regulator is developed below, and in developing this theory the following assumptions are made:

(1) Assume the base current of transistor Q2A, the current in line 104, is small compared to the current flow through the voltage divider circuit, through lines 86, resistance 90, resistance 92 and resistance 96. Assume that the base current of Q1, in the upper half of line 80 is small compared to the collector current in transistor Q2A, and the lower portion of line 80.

(2) The value of resistance R1 is very much larger than the resistance of R3.

(3) Initially assume that there is no current flow through resistance R4.

(4) Assume that voltage $v1$ is equal to $v2$, for the transistors Q2A and Q2B are matched.

With these assumptions, the following steps in the development of the theory indicate the ideal characteristics of this regulator.

Let $$\frac{1}{n} = \frac{R1}{R1+R2}$$

This defines the voltage divider ratio. Then:

$$V_1 = E\left(\frac{R1}{R1+R2}\right)$$

This is valid since R3 is very much smaller than R1. Thus by substitution:

$$V_1 n = E$$

By examination of the drawing and the voltages indicated thereon, it becomes apparent that:

$$V_1 = v_1 + (e - v_2)$$

By substitution $$E = n(v_1 + e - v_2)$$

By further examination of the drawing, it becomes apparent that:

$$E_p = +R_p I + V_1 + R_e I + E$$

Defining G as the gain of transistor Q2A:

$$G = \frac{V}{nv_1}$$

and $$nv_1 = \frac{V}{G}$$

Substituting, $$E = \frac{V}{G} + n(e - v_2)$$

and $$E = \frac{E_p - R_p I - R_e I - E}{G} + n(e - v_2)$$

Resolving terms this leads to:

$$E + \frac{E}{G} = n(e - v_2) + \frac{E_p}{G} - \frac{(R_p + R_e)I}{G}$$

$$E\left(1 + \frac{1}{G}\right) = \left(n(e - v_2) + \frac{E_p}{G}\right) - (R_p + R_e)I$$

Assuming that G is very much larger than 1, this simplifies to:

$$E = n(e - v_2) + \frac{E_p}{G} - \left(\frac{R_p + R_e}{G}\right)I$$

Assuming now that there is current flowing through R4, the values of R3 and R4 are established such that:

$$\frac{R_3}{R_3 + R_4} = \frac{1}{G}$$

With current thus flowing in R3 and R4, a signal equal in amplitude to $$-E_p\left(\frac{1}{G}\right)$$

is fed to the voltage divider, thus cancelling the $$\frac{E_p}{G}$$

term above. This eliminates any change in E due to changes in $E_p$.

In like manner R2 is made equal to $R_p + R_e$ and thus a signal equal to $$\left(\frac{R7}{G}\right)I \text{ or } \left(\frac{R_p + R_e}{G}\right)$$

I is fed back to cancel any drop in E due to this term.

The final output of the regulator thus becomes:

$$E = n(e - v_2)$$

From this last equation it can be seen that each of the terms is fixed so that the output voltage is constant. Of course, the $n$ term defines the voltage divider ratio, and accordingly the output voltage can be adjusted. However, with a fixed ratio, the output voltage becomes defined by the constant voltage $e$ defined by the Zener diode and by the emitter-base voltage of the transistor Q2B. Both of these values are constant and accordingly the final regulated voltage is constant. This constancy is established both in theory and in practice and the voltage regulator of this invention is superior both in theory and in practice to those available and known in the art.

In operation, the circuit acts in the following manner. The voltage between lines 40 and 60 is the unregulated voltage of the D.C. power source. In the absence of current flow through resistor 64, this voltage appears at summing point 94. Furthermore, upon current flow through resistor 64 in accordance with load requirements, the voltage drop across sampling resistor 64 is represented at summing point 94. This is the input to the voltage divider, and changes in voltage and current at the output of resistance 64 appear at summing point 94 and are represented at the center tap 100, which is the division between resistance 90 and 92 of the voltage divider. This appears as the base to emitter bias of transistor Q2A of the differential amplifier. The differential amplifier is represented in transistor envelope 102 by transistors Q2A and Q2B. The emitters are connected, through resistor 103 to bus 60. Power is supplied to the collector of transistor Q2A through resistor 84, and to the collector of transistor Q2B by line 110. The reference voltage is applied to the base of transistor Q2B from Zener diode 116.

It is thus apparent that voltage excursion at summing point 94 effects the base to emitter bias of transistor Q2A. This has the effect of increasing and decreasing the conductance of the two transistors in the envelope 102.

As line 66, with reference to line 60, becomes more positive either due to reduction in the output voltage $E_b$ or due to an increase in current flow through resistor 64, summing point 94 becomes more positive which in turn makes more positive the base to emitter voltage in transistor Q2A. This decreased negative bias reduces emitter to collector conductance and moves the transistor toward cut off. In normal condition these transistors operate in a varying conductance range, without going to full cut off or full conductance. However, this reduces the current flow through resistor 84 causing a more negative bias on the base of transistor Q1 which in turn increases the conductance of transistor Q3. Since the emitters of transistors Q2A and Q2B are connected together, and the base of transistor Q2B is connected to the reference voltage, this decrease in conductance of transistor Q2A is accompanied by an increase in conductance of transistor Q2B. By means of this differential amplifier characteristic of the transistors in envelope 102, and the reference voltage is connected as base to emitter bias of transistor Q2B, the base to emitter bias of transistor Q2A is compared and its conductance is regulated in accordance with the reference voltage. Thus, it is seen that a constant voltage is maintained.

This invention having been described in its preferred embodiment, it is apparent from the study of the preceding specification and the attached drawing that it is subject to minor modifications within the skill of the routine engineer. Accordingly, the scope of this invention is defined by the scope of the appended claim.

I claim:

In a direct current voltage regulator, means to supply an unregulated direct current voltage in excess of the desired regulated voltage, said means of supply having an internal resistance, means to connect a load across said regulated voltage, a pair of buses between said means to supply an unregulated voltage and the load, variable conductance means comprising a variable conductance transistor in one of said buses, said variable conductance means being varied to impress a substantially constant voltage upon the load, said variable conductance means being a transistor, a further transistor having a base controlling said variable conductance transistor, the resistance from said base to said bus containing said variable conductance transistor being the equivalent base to emitter resistance of said transistors;

means to regulate the conductance of said variable conductance means, said means to regulate including a voltage divider comprising a first resistance and a second resistance, said second resistance being connected to said one bus adjacent said load, third and fourth resistances connected in series between said buses, said first resistance being connected between said third and fourth resistances so that said voltage divider is connected to receive an indication of the voltage in the other said bus and the variations in voltage in said one bus due to variations in supply voltage so that the voltage across the load remains substantially constant;

a resistance in said bus containing said variable conductance transistor, said resistance being made equal to the sum of the internal resistance and said equivalent resistance, one end of said resistance being connected to the base of said further transistor to feed thereto a signal substantially equal to and opposite in sign to said internal resistance and said equivalent resistance whereby said variable conductance transistor controls the voltage on the load independently of the resistance.

References Cited by the Examiner
UNITED STATES PATENTS 3,096,475   7/1963   Brooks              323—22
3,178,633   4/1964   Slusher            323—22

JOHN F. COUCH, *Primary Examiner.*

K. D. MOORE, *Assistant Examiner.*